April 21, 1959   J. W. THIEME ET AL   2,882,806
PLANETARY CLUTCHING BRAKE
Filed April 23, 1956   2 Sheets-Sheet 1
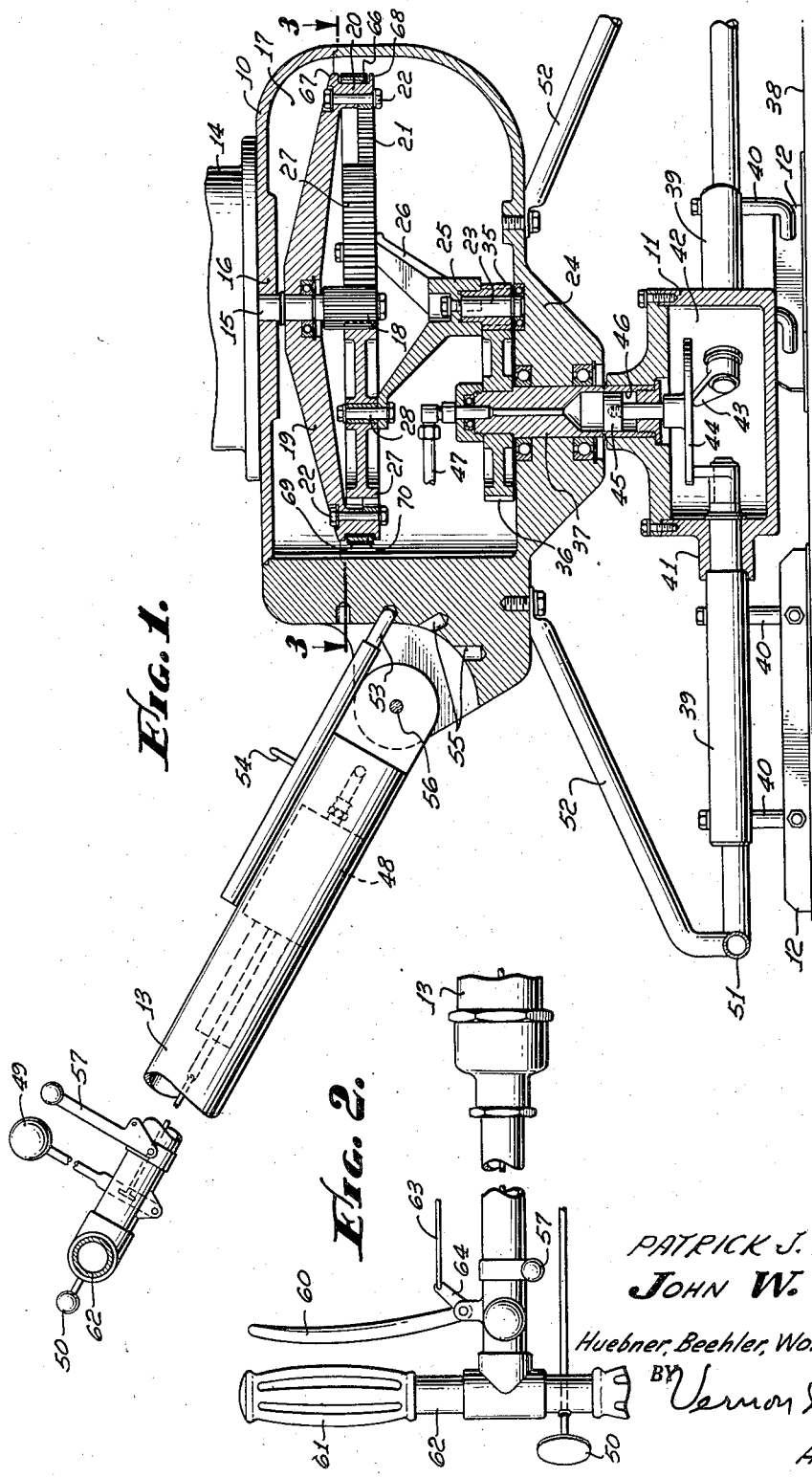
PATRICK J. MCDONNELL
JOHN W. THIEME
INVENTOR.
Huebner, Beehler, Worrel & Herzig.
BY
ATTORNEYS.

April 21, 1959 J. W. THIEME ET AL 2,882,806
PLANETARY CLUTCHING BRAKE
Filed April 23, 1956 2 Sheets-Sheet 2

PATRICK J. MCDONNELL
JOHN W. THIEME
INVENTOR.

Huebner, Beehler, Worrel & Herzig.
BY
ATTORNEYS.

United States Patent Office 2,882,806
Patented Apr. 21, 1959

2,882,806

PLANETARY CLUTCHING BRAKE

John W. Thieme, West Compton, and Patrick J. McDonnell, Compton, Calif.; said McDonnell assignor to said Thieme Application April 23, 1956, Serial No. 580,014

3 Claims. (Cl. 94—45)

The invention relates to rotating mechanisms and has particular reference to a clutching connection especially acceptable for use in concrete and cement finishing machines wherein a combustion engine is used to rotate troweling blades riding on the surface of newly poured concrete.

Recent developments have indicated a very great desire on the part of concrete contractors to employ wherever possible concrete and cement finishing machines to perform the finishing work for which hand labor has long been depended upon. Such machines have been used not only for large areas but also to an important degree for the finishing of smaller areas because of the time-saving factor and also because of the fact that the work accomplished by such machines is uniform and dependable. Among those machines heretofore developed certain limitations have appeared which have impaired to a degree acceptance for various types of work. In many instances the machines have had to be built so heavy that the efforts of two men have had to be depended upon to shift them from one location to another. It is also true with machinery of this kind that even though a combustion engine be depended upon for the actual work involved, it is still necessary to manipulate the machine manually about the work surface and that when the machine is heavy or unmanageable or where it cannot be carefully controlled as to vary its operation. The time and effort consumed in so manipulating existing machines cuts down to an appreciable degree the amount of work which can be done in a given length of time.

Also mechanisms in such machines have been complicated to a degree rendering them subject to mechanical failures not easily remedied, especially in the field, and also subject to deterioration on account of the effect of the hardening of moist concrete such that on frequent occasions some rather substantial investments are tied up in machines not immediately ready for operation when needed.

It is therefore among the objects of the invention to provide a new and improved clutching brake device of light-weight dependable type which responds readily to control.

Another object of the invention is to provide a new and improved light-weight clutching brake which can be readily adjusted to a desired gear reduction installation and which though light in weight is so constructed that it is rugged and is affected by wear to a relatively minimum degree.

Still another object of the invention is to provide a new and improved clutching brake device which is economical in that parts are simple and easily assembled without sacrifice of dependability.

A further object still is to provide a new and improved power actuated cement finishing machine combination in which a new and improved brake is built as part of the drive mechanism so located and so constructed that the mechanism as a whole is compact, positive-acting, and light in weight, thereby being sensitive and responsive to easy manipulation by the operator.

With these and other objects in view, the invention consists in the construction, arrangement and combination of the various parts of the device whereby the objects contemplated are attained, as hereinafter set forth, pointed out in the appended claims and illustrated in the accompanying drawings.

In the drawings:

Figure 1 is a longitudinal sectional view of the device showing the brake mounted for operation with a rotary finishing machine.

Figure 2 is a plan view of the control handle of the device in Figure 1.

Figure 3:
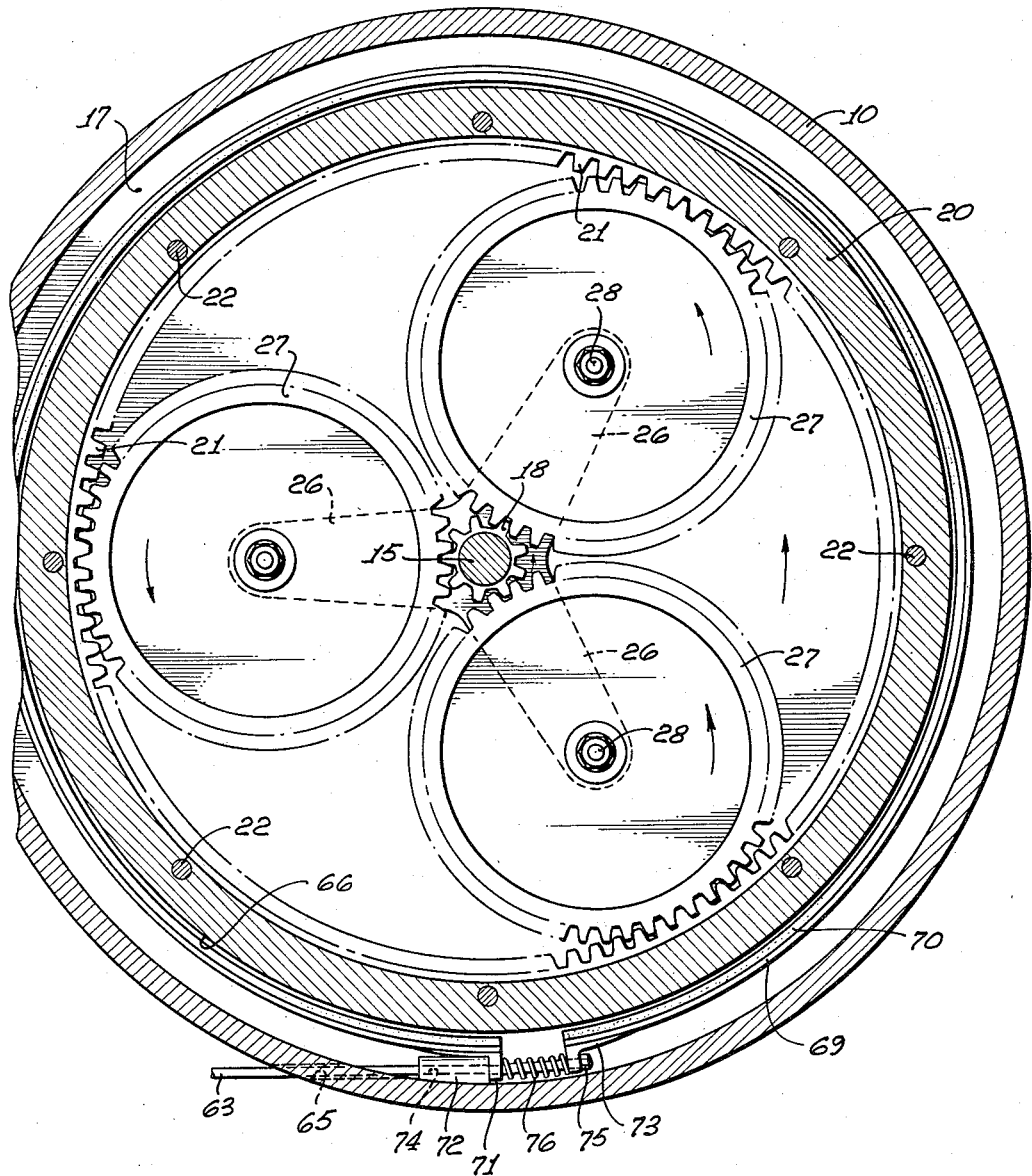
Figure 3 is a cross-sectional view taken on the line 3—3 of Figure 1.

In the embodiment of the invention chosen for the purpose of illustration there is shown a concrete or cement finishing machine embodied in a housing 10 below which is mounted a rotor casing 11 equipped with a series of radially extending blades 12. The housing is manipulated by means of a handle 13 provided with suitable convenient controls. A motor partially indicated and identified by the reference character 14 provides motive power transmitted through appropriate mechanism in the casing and rotor housing to the blades.

More particularly a drive shaft 15 rotatably mounted in an appropriate bearing mount 16 forming the upper portion of the housing 10 extends into a chamber 17. At the lower end of the drive shaft is a drive pinion or sun gear 18.

Suspended from and rotatably mounted with respect to the drive shaft is an inside ring gear member having teeth on an inside face thereof comprising a hanger 19, at the perimeter of which is a downwardly extending annular flange 20. On an inner vertical face of the flange 20 is a ring gear 21 secured thereto by suitable bolts 22. The hanger 19 is in effect a portion of one brake element.

A driven shaft 23 is rotatably mounted in an appropriate bearing mount 24 which comprises a part of the lower section of the housing 10. Keyed to the driven shaft 23 is a spider or carrier 25 from which arms 26 extend upwardly to locations uniformly spaced within the ring gear 21. On the uppermost end of each of the arms, three of which are shown in Figure 3, there is an idler or planetary gear 27 which rotates about a suitable idler shaft 28 in each instance. Each idler gear meshes with the ring or orbit gear 21 and with the drive pinion 18, this relationship being clearly shown in both Figures 1 and 3.

Also keyed to the driven shaft 23 is a transmission pinion 35 which meshes with a transmission gear 36. The transmission gear in turn is keyed to a rotor shaft 37 which is rotatably mounted upon suitable bearings in the bearing mount 24 previously referred to.

Non-rotatably fixed upon the rotor shaft is the rotor casing 11 so that the rotor casing is driven rotatably through the gear train in the housing 10 in response to actuation of the drive shaft 15.

The blades 12, which are troweling blades for working and surfacing a surface 38 of moist concrete, are affixed respectively to rods 39 by suitable brackets 40. The rods are rotatably mounted each in its respective boss 41 which extends radially outwardly from the rotor casing 11. Within the casing is a rotor chamber 42 wherein cam arms 43 in engagement with a cam disc 44 enable an appropriate hydraulic piston 45 to tilt the blades to one or another of a variety of positions of adjustment. The piston 45 is mounted within an appropriate hydraulic cylinder 46 into which hydraulic fluid is sent through a fluid line 47 from a pump 48 in the handle 13. A pump handle 49 may be used to work up hydraulic pressure for the positioning of the blades. When the pressure is to be released a pressure release knob 50 at the outer end of the handle is manipulated so that blades may be returned by weight of the apparatus upon them to an initial position.

To protect the operator from the rotating blades a guard ring 51 extending around the outer ends of the blades is mounted to the lowermost portion of the housing 10 by means of legs 52.

The handle 13 can be moved up or down to a desired position by first releasing a pin 53 by manipulation of a lever 54 so that the pin may be withdrawn from one of the pin holes 55 and subsequently be inserted into another. The handle rotates about a pivot pin 56. To control the throttle on the motor there is provided a throttle control 57 located near the outermost end of the handle 13, connections to the motor of which have been omitted for improving the clarity of illustration inasmuch as the connection is substantially conventional.

To control the brake there is provided a brake handle 60 located conveniently near one of the handholds 61 on a crossbar 62. A cable 63 attached to a bell crank 64 of the brake handle 60 extends through a suitable aperture 65 into the chamber 17 within the housing 10.

On the outer circumference of the flange 20 there is provided a brake face 66 on opposite edges of which are rims 67 and 68. A brake band 69 provided with a suitable brake facing 70 extends around the brake face and lies between the rims 67 and 68. A stationary bracket 71 is secured to one end of the brake band and lies in contact with a boss 72 extending into the chamber 17 from the inner wall of the housing 10. A movable bracket 73 is attached to the opposite end of the brake band. The cable 63 extends through an appropriate hole 74 in the boss 72 and thence through outer ends of the brackets 71 and 73. A nut 75 secures the cable to the movable bracket 73. In order that the brake band will normally lie in disengagement with respect to the brake face, there is provided a coiled spring 76 positioned between the brackets 71 and 73 and normally holding them apart.

In operation when the drive shaft 15 is being rotated by the motor, the drive pinion 18 will be rotating the idler gears 27 and these in turn will cause the hanger 19 to rotate by reason of the fact that the idler gears 27 mesh with the ring gear 21. Since the ring gear is free to rotate at this point, the arms 26 and spider 25 will remain stationary inasmuch as the idler gears freely rotate on their respective idler shafts 28. When it is desired to engage the brake the brake handle 60 is drawn toward the handle 61 and tension on the cable 63 draws the movable bracket 73 toward the fixed bracket 71 against tension of the spring 76 and the brake band 69 is impressed against the brake face 66. Frictional force thus set up between the brake band and the brake face stops rotation of the flange 20 and hanger 19. When this occurs, rotation induced in the idler gears 27 forces them to travel around the inner circumference of the ring gear 21 and as they travel they rotate the arms 26 and spider 25 about the axis of the driven shaft 23 and cause the driven shaft to rotate. As the driven shaft rotates, the transmission pinion mounted thereon causes the transmission gear 36 to rotate and hence the rotor shaft 37 which results in rotation of the blades 12.

When it is desired to stop rotation of the blades, the brake handle 60 is released and tension in the spring 76 then forces the brackets apart and releases the clutch band from the clutch face.

By reason of the large circumference of the brake band and the appropriate brake face, relatively little pressure is necessary to completely engage the brake. Likewise, a relatively slight movement is all that is needed on the brake handle to cause engagement. Because of the lightness of pressure requisite the brake can be engaged and subsequently permitted to disengage with relatively little effort expended on the part of the operator. Hence a very effective control is maintained over brake operation and hence rotation of the blades at all times, thereby obviating the necessity of any great degree of manipulation of the throttle for the motor. All of the controls located as they are within finger reach of the control handles render complete manipulation of both the tilt of the blades and the speed of rotation of the blades a matter of ready control. These adjustments are within the effective control of the operator at all times and at the expenditure of relatively little effort. Hence the apparatus can be operated without undue fatigue on the part of the operator with a resulting efficiency in the over-all application of the machine to its finishing job.

While we have herein shown and described our invention in what we have conceived to be the most practical and preferred embodiment, it is recognized that departures may be made therefrom within the scope of our invention, which is not to be limited to the details disclosed herein but is to be accorded the full scope of the claims so as to embrace any and all equivalent devices.

Having described our invention, what we claim as new and desire to secure by Letters Patent is:

1. A cement finishing machine comprising a closed housing having upper and lower walls forming a closed chamber, a handle on one side of said housing, a balanced rotor shaft assembly rotatably mounted on a lower wall of said housing and extending therethrough, a rotor casing on said shaft having troweling blades balanced about the axis thereof at a location below said housing, said blades forming a moving support for the machine during operation, a transmission gear in the lower part of the chamber keyed on said shaft, a driven shaft on an axis parallel to said rotor shaft and rotatably mounted in said lower wall on a side of the rotor shaft opposite from said handle, a centrally balanced transmission assembly in said chamber comprising an open spider on said driven shaft and a pinion thereon in mesh with said transmission gear, arms on said spider carrying planetary gears rotatably mounted in a horizontal plane at locations overlying said transmission gear during operation, said transmission assembly including a drive shaft rotatably mounted on the upper wall in axial alignment with said driven gear, a sun gear on said drive shaft in mesh with said planetary gears, a ring gear member having a ring gear thereon overlying said transmission gear and in mesh with said planetary gears, said ring gear member being carried by said drive shaft and rotatable relative thereto, a friction band face on the exterior of said ring gear member, a split complementary friction band mounted on the housing in said chamber having adjacent mutually shiftable ends, resilient means between said ends, said last named friction band being thereby normally spring biased to a position of disengagement with said friction band face, one of said mutually shiftable ends having a fixed position relative to the housing and a control on said handle extending through said housing into engagement with the other mutually shiftable end of said friction band and adapted to be moved manually against said spring bias to a position enabling engagement of said friction band to stop rotation of the ring gear whereby to initiate rotation of said rotor casing.

2. A cement finishing machine comprising a closed housing, a handle on one side of said housing, a rotor shaft, a rotor casing on said shaft rotatably mounted below said housing and troweling blades extending radially outwardly from said casing, said housing having a transmission chamber therein, a transmission gear in the chamber on said rotor shaft, a driven shaft geared to said rotor shaft on an axis offset relative thereto and rotatably mounted in said chamber on a side of said rotor shaft opposite from said handle, a spider keyed to said driven shaft, a plurality of planetary gears in the chamber rotatably mounted on the spider, a drive shaft rotatably mounted in said chamber centrally relative to said planetary gears and in axial alignment with said driven shaft and a sun gear thereon in mesh with said planetary gears, a hanger, a ring gear on the hanger having inner teeth thereon in mesh with said planetary gears, said hanger being rotatably mounted on said drive shaft, an annular brake contacting face on said hanger and a brake band encircling said face, having portions movable one with respect to the other and having a circumference variable in size, and control means comprising attachments on the respectively movable portions, one of said attachments being in engagement with the housing, resilient means engaging said attachments biased to move said attachments and the respective element to disengaged position, and means secured to the other of said attachments and extending to the exterior of the casing adapted to move said last named element to engaged position to stop rotation of the ring gear whereby to initiate rotation of said casing.

3. A cement finishing machine comprising a closed housing, a handle extending radially outwardly from one side of said housing, a rotor shaft rotatably mounted on a lower wall of said housing and extending therethrough, a rotor casing on the lower outside end of said shaft rotatably mounted below said housing and troweling blades extending radially outwardly from said casing and in a position supporting said machine, said housing having a transmission chamber therein, a transmission gear on said rotor shaft at the lower end of said chamber, a driven shaft rotatably mounted on said lower wall on an axis parallel to said rotor shaft and at a side of the lower end of said chamber opposite from said handle, a transmission pinion on said driven shaft in mesh with said transmission gear, an open spider keyed to said driven shaft having a plurality of radially upwardly and outwardly extending extensions and a planetary gear rotatably mounted on each extension, a drive shaft rotatably mounted in an upper wall of the housing at the upper end of said chamber and in a position centrally relative to said planetary gears, and a sun gear on the drive shaft in mesh with said planetary gears, a hanger in the chamber, a ring gear on said hanger having teeth on an inner face thereof in mesh with said planetary gears, said hanger being attached to said drive shaft and rotatable relative thereto, a brake face on said hanger and a brake band on said housing encircling said brake face, said brake band being of variable circumference, a bracket on respectively movable ends of the brake band, a stop on the casing engaging one of said brackets, spring means engaging said brackets biased in a direction separating said brackets and control means between the other bracket and the handle adapted to move portions of said brake band into a braking position with said brake face to stop rotation of the ring gear whereby to initiate rotation of the rotor casing.

References Cited in the file of this patent

UNITED STATES PATENTS

| | | |
|---|---|---|
| 995,552 | Osborn | June 20, 1911 |
| 1,404,081 | Auvil | Jan. 17, 1922 |
| 1,676,344 | Newmann | July 10, 1928 |
| 2,594,331 | McCrery | Apr. 29, 1952 |